P. H. BARTLETT.
TESTING CUT-OUT.
APPLICATION FILED JAN. 22, 1917.
1,330,230.
Patented Feb. 10, 1920.
3 SHEETS—SHEET 1.
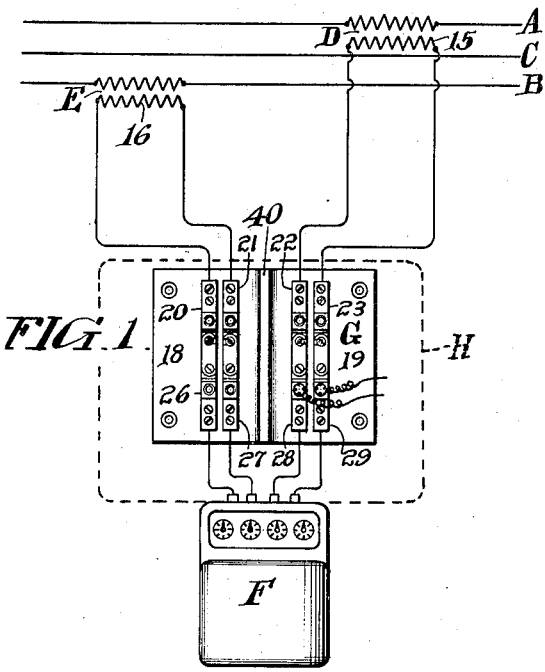
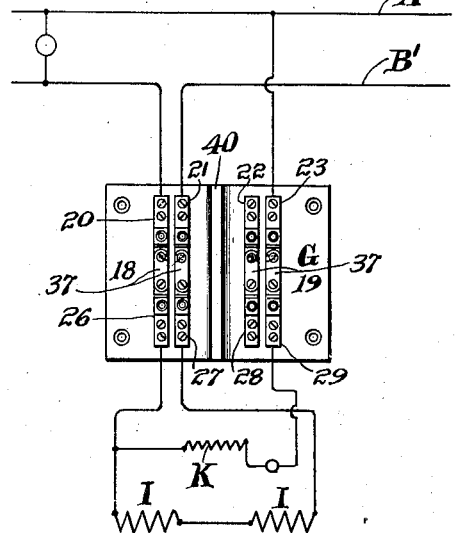
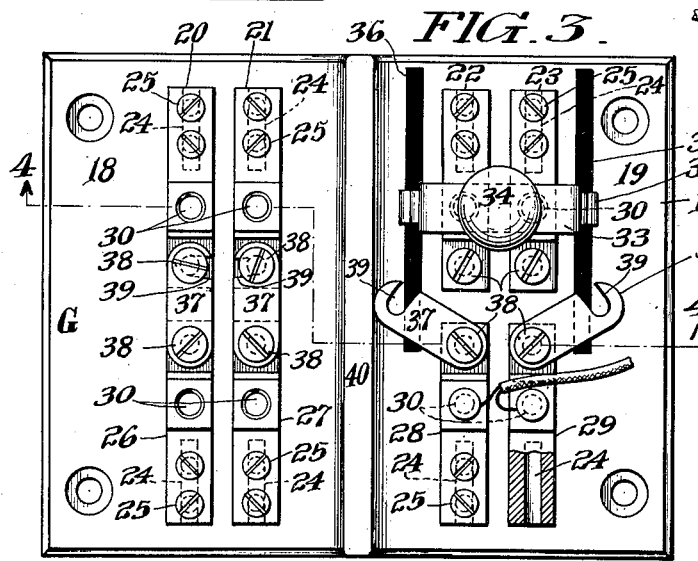
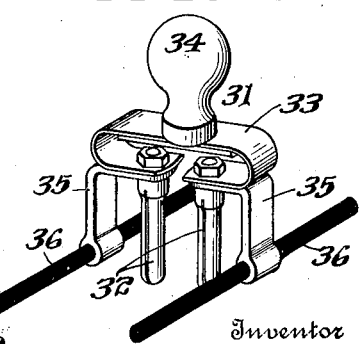
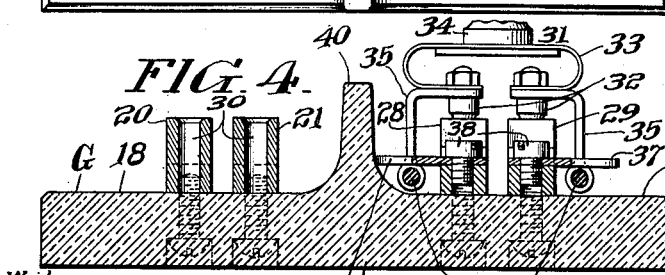
Witness.
Gertrude Bader.
Inventor
Percy H. Bartlett
By Wm Steell Jackson
Attorney P. H. BARTLETT.
TESTING CUT-OUT.
APPLICATION FILED JAN. 22, 1917.
1,330,230.
Patented Feb. 10, 1920.
3 SHEETS—SHEET 2.
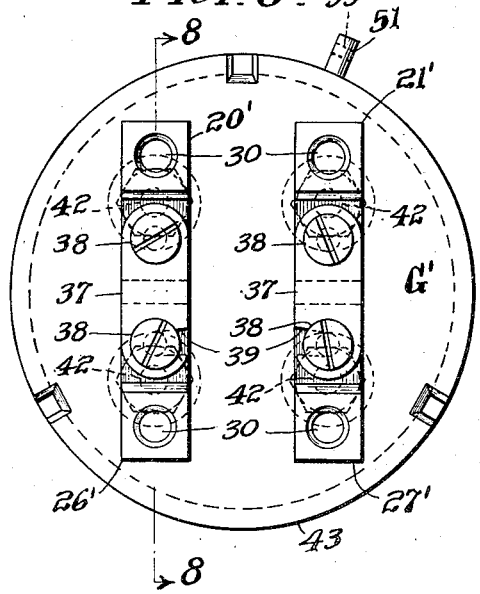
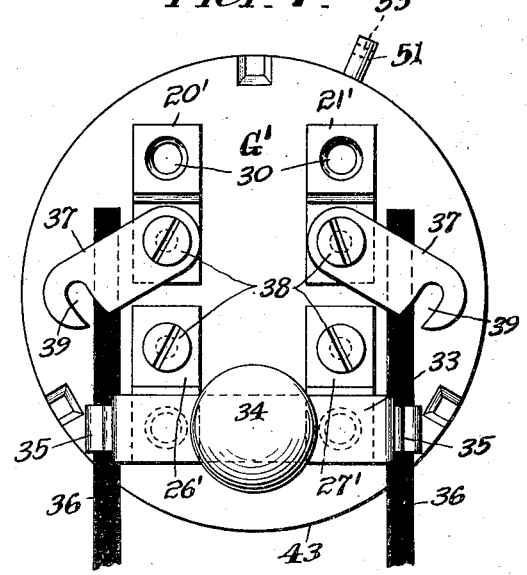
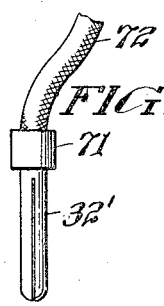
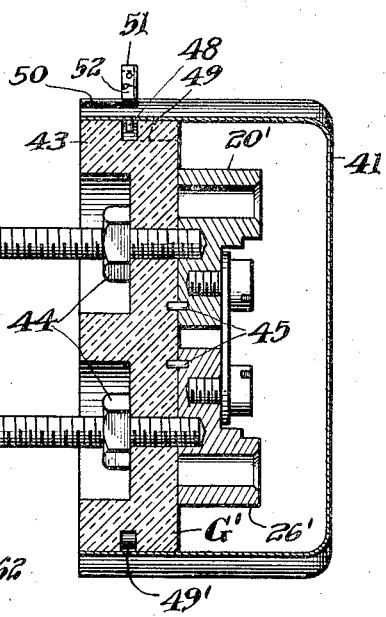
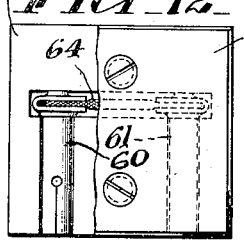
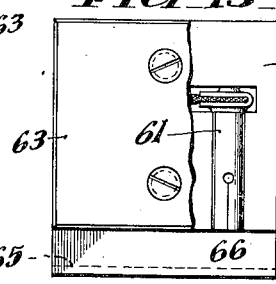

P. H. BARTLETT.
TESTING CUT-OUT.
APPLICATION FILED JAN. 22, 1917.

1,330,230.

Patented Feb. 10, 1920.
3 SHEETS—SHEET 3.

Inventor
Percy H. Bartlett
By Wm Steell Jackson
Attorney

WITNESS
Gertrude Buder.

UNITED STATES PATENT OFFICE.

PERCY H. BARTLETT, OF PHILADELPHIA, PENNSYLVANIA, ASSIGNOR OF ONE-THIRD TO JOSEPH B. SEAMAN AND ONE-THIRD TO BURLEIGH CURRIER, BOTH OF PHILADELPHIA, PENNSYLVANIA.

TESTING CUT-OUT.

1,330,230.        Specification of Letters Patent.        Patented Feb. 10, 1920.

Application filed January 22, 1917. Serial No. 143,665.

*To all whom it may concern:*

Be it known that I, PERCY H. BARTLETT, a subject of the King of Great Britain, residing at 521 Midvale Ave., Philadelphia, in the county of Philadelphia and State of Pennsylvania, have invented a certain new and useful Testing Cut-Out, of which the following is a specification.

My invention relates to test blocks intended particularly to connect secondaries of series transformers with the current coils of test instruments or short circuit them.

The purpose of my invention is to short circuit the terminals of a transformer secondary by means which are difficult of removal until the circuit is restored to its normal connections.

A further purpose of my invention is to form movable connecting links in one side and preferably in both sides of the connections between a transformer secondary and the testing instrument and to short circuit the terminals connected with the transformer, when the test is being conducted, by a plug which is retained by either link in open position.

Further purposes will appear in the specification and claims hereof.

I have preferred to illustrate my invention by but three of the forms in which it may appear, selecting three which have been tried out by me, have proved to be practical, efficient and reliable and which at the same time well illustrate the principles of my invention.

Figures 1 and 2 are diagrammatic views showing one form of my apparatus in top plan view and illustrating applications of the invention.

Fig. 3 is an enlarged top plan view of the same form of my invention with one short-circuiting plug in position and two links open.

Fig. 4 is a section of Fig. 3 upon line 4—4.

Fig. 5 is a perspective view of the form of short-circuiting plug preferred by me.

Figs. 6 and 7 are top plan views of a second form of my invention, with the cover removed, showing different positions of parts and, in Fig. 7, including a short-circuiting plug.

Fig. 8 is a section of Fig. 6 upon line 8—8 thereof.

Fig. 12 is a side elevation, partly broken away, of another form of short-circuiting plug.

Fig. 13 is a side elevation, partly broken away, of a modification of this second form of short-circuiting plug.

Figs. 14 and 15 are a top plan view and a transverse section through the screw upon line 15—15 of a new form of fastening for securing the wires to the terminals.

Fig. 16 is a side elevation of a plug and cord.

In the drawings similar numerals indicate like parts.

Figure 9:
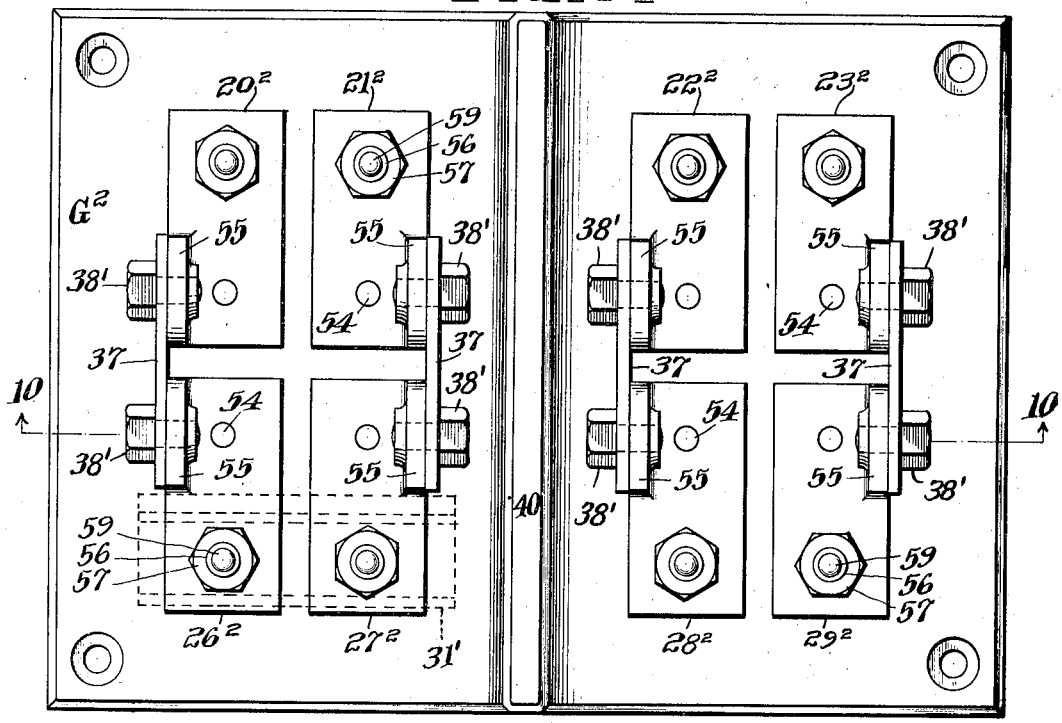
Figs. 9, 10 and 11 are a top plan view section thereof upon line 10—10 and side elevation with fragmentary plug in section, respectively, of another form of my invention.

My invention will find its greatest utility in connections for supplying the current coils of test instruments and has therefore been described as applied to this use.

In Fig. 1, I have shown a two-phase circuit having the sides A and B and neutral C with series transformers D and E in the two sides of the circuit. The secondaries 15 and 16 are to be connected with the current coils of any type of ammeter, watt meter, watt hour meter, or other instrument F normally required and occasionally to be tested and in which the amperage must have representation, through a block G which is mounted permanently. A locked cover H is placed over the entire block and connections, except when a test is being conducted.

By forming permanent test block connections, I avoid the uncertainties of attempting to locate the proper wires back of the board and to connect them specially for separate tests, as indicated by me more fully in my co-pending application, Serial No. 3906 for indicating and testing supply switch box, filed January 23, 1915.

As the secondaries of these series transformers must be protected against opening of their circuits when the instruments to which they are normally connected are being tested, I make special provision for this protection.

The apparatus seen in Figs. 3 and 4 comprises an insulating base 17 having provision upon each side 18 and 19 thereof for handling one side of a two-phase current. The secondaries of the two transformers are connected with test block terminals 20, 21, 22 and 23 respectively, where they are mechanically and electrically secured within seats 24 by screws 25. These terminals are mechanically spaced and electrically insulated from terminals 26, 27 and 28, 29 respectively, to which measuring instrument F is connected. The connection is made by seats 24 and screws 25.

Each terminal is provided with a plug opening 30 for engagement by the pin of a suitable short circuiting plug or for plug connection of an outside circuit for test purposes. One form of short-circuiting plug is shown at 31, in Fig. 5. The split pins 32 of the plug fit these openings 30 and are electrically connected by a spring support 33 to which the handle 34 is attached. When the plug is in place this handle extends too far above the block for the cover H to be put in place, warning that the plug has been improperly left in position. Arms 35 are conveniently retained between the pins and spring and help to electrically connect them. At their lower ends the arms are transversely extended in the form of rods 36, some part of the arms being insulated so as not to electrically connect the rods with the pins or spring 33. I find that the simplest means of accomplishing this to make the rods of insulating material. In my claims I have considered the arms as including the rods 36.

Pins have been selected for this form of short-circuiting plug because they harmonize better with the rest of the construction of the plug than other connectors, such as sockets, would; but sockets can be used in the plug to fit upon pins in the terminals with part of the benefit of my invention, as seen in Figs. 12 and 13; and other forms of connection will doubtless occur to the designer in view of my disclosure.

The spaced terminals of one set of terminals upon the same side of the block are connected with those of the other set upon the same side by links or clips 37, secured in the illustration by screws 38.

When these links or clips are in the position shown at the left in Fig. 3, the circuit is connected through from the transformer secondary to the regular measuring instrument but in the position shown at the right in Fig. 3 the circuit from the transformer to this regular instrument is interrupted by the opening of the links and the regular instrument is connected by plugs and conductors with a test circuit in which appropriate test instruments are located. The character of the circuits formed for this test is well known and need not be described as my invention does not alter the general arrangement of the test circuits but concerns apparatus facilitating their completion and protecting against injury. When testing, the short-circuiting plug is intended to be kept in the position shown at the right in Fig. 3, short-circuiting the terminals on the transformer side of the block, lying between the transformer and the links.

Insertion and removal of the short-circuiting plug within or from openings 30 causes the arms (rods 36) to travel across the path of opening movement of the links, protecting against careless withdrawal of the plug while the links are in open position (shown at the right in Fig. 3). The links are cut at the sides at 39 to pass beneath the heads of the corresponding screws 38 by lateral movement, without complete removal of the screws.

The diagram in Fig. 2 is intended to illustrate the capability of the same block for connection of a single phase circuit with the potential and current coils of a watt-hour meter, without transformer connections. Here the side A' of the single-phase circuit is connected by one of the pair of block connections at the right of the block, through the potential coil K of the meter, and the side B' of the circuit is connected by one of the left hand block connections and through the current coils I of the meter, the potential and current coil connections being here joined and both passing through the other of the left hand block connections. The short-circuiting plug is here applicable at the left hand side when the testing circuit is open to maintain the continuity of the side B'.

The barrier 40 performs several functions. It separates the two sets of terminals and connecting strips, extending above the block far enough to prevent possibility of accidental cross connection between, and at the same time serves as a partial guide for the short-circuiting plugs preventing them from being "straddled" across from one set of terminals toward another, with the pins in the wrong openings.

Figs. 6 to 8 inclusive show a second form of my invention with but two terminals at each side and two connecting links. These are of the same character as the two upon either side of the block shown in Fig. 3 and will not require further explanation for that reason. The base of the block G' is here circular instead of rectangular, as in the first form, and the rib 40 is omitted. I have shown a cap 41 in this construction and have omitted the holes 24 with screws 25 for retaining the ends of the two circuits within the terminals, using instead four screws 42 upon the under side of the base 43, which are electrically connected respectively with the terminals 20', 21', 26' and 27'.

The screws retain the terminals in position and are "locked" in place by nuts 44. Pins 45 prevent swinging movement of the terminals. The screws carry a plurality of nuts 46 and washers 47 for retaining the base upon a switch board or mount and making the electrical connections with it.

The short circuiting plug 31 may be used with this construction. One end of each of its rods 36 will extend beyond the base, desirably preventing the cap from being put on until the plug has been removed.

The cap 41 is fitted to place and held in position by a double bayonet slot construction, pins 48 upon the interior of the cover entering slots 49 in the base parallel to the axis of both and being turned into circumferentially extending base slot 49' at the same time that pin 51 upon the base enters a keyhole slot 50 in the cover. When the cover is in place the pin 51 lies close to a pin 52 fixed upon the cover and both are apertured as at 53 for a seal wire.

Figure 10:
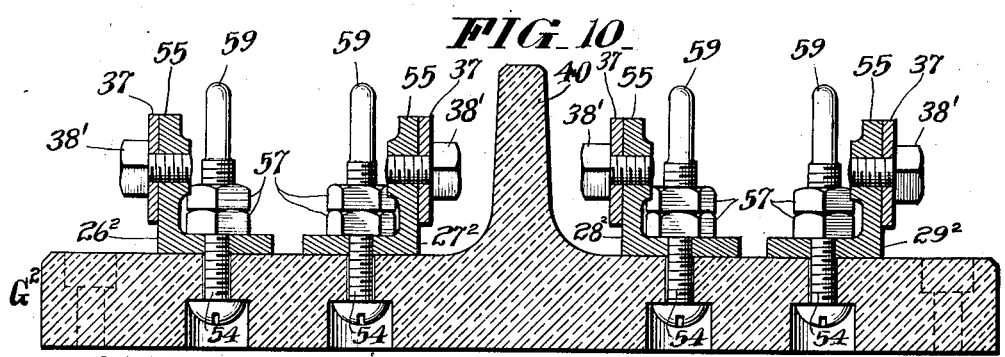
Figure 11:
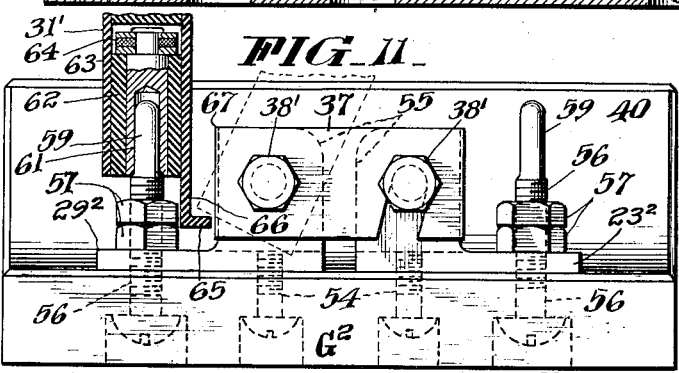

In the form shown in Figs. 9 to 11, inclusive, the base of block G² is rectangular and the rib 40 is used. Two sets of connections are shown, one set on each side of the barrier as in Figs. 1 to 4. Links are shown but are here movable vertically to separate the terminals instead of horizontally and, suited to heavier construction, are held by bolts 38'.

The several terminals 20², 21², 23², 26², 27², 28², and 29² are in the form of flat strips retained upon a base by screws 54 which are threaded into the terminals from below. They carry ears 55 for the links. Studs 56 are screwed into the horizontal flanges of the terminals from above and are locked in position by nuts 57. Corresponding nuts 57 are used to hold the terminal wires as in a binding post and the studs are extended to form unthreaded extensions 59 which fit into the sockets 60 and 61 of a short-circuiting plug 31', insulated by intermediate members 62 and covers 63. The sockets 60, 61 are given play in the insulation and are connected by flexible conductor 64, securing much the same effect as by the spring in my first form. The unthreaded extensions 59 also act as guide pins upon which the nuts may be started freely, the pins keeping them straight and guiding them reliably upon the threaded portion.

The form of short-circuiting plug shown in Fig. 12 is not intended to interlock with the links but it may be interlocked with the links readily to prevent careless removal of the plug while the links are open. I have shown one means for this in Fig. 13, where the side insulation of the plug on either or both side may be laterally projected as at 65 (and in this case extended in its own plane also as at 66) so that this projection or flange 65 shall act as a stop for the corner 67 of the link but permitting full opening. The corner will then lie in the path of removal movement of the projection or flange upon the short-circuiting plug.

This last form of my block provides the same capabilities for circuit connection that are provided for in the form shown in Fig. 1.

In Figs. 14 and 15 a form of terminal is shown of the general type disclosed in Figs. 1 to 4 and 6 to 8 but having a longitudinal top channel or groove 68 terminating at the sides in a sloping wall 69 which at the back is arced to follow the general contour of the binding screw 25. When the wire 70 is put in place and the screw 25 is forced home, the wire is crowded down along the sloping wall 69 into the generally triangular space between it and the head and shank of the screw giving excellent contact and supporting the wire outside the arc by the wall 69' of the channel.

In Fig. 16 a split pin 32', collar 71 and flexible cord 72 are shown, of the type which I prefer to use for connection of outside test circuits, but which are shown diagrammatically in Figs. 1 and 3 for clearness. Of course, where the short-circuiting "plug" is provided with sockets, as in Figs. 12 and 13 the "plugs" for outside circuit connection must be similarly accommodated to the character of connections upon the terminals.

My short circuiting plugs will be maintained in position during all preparations for making a test, and during the test, until the links have been closed to connect up the instrument normally used, and are adapted for use in any station or sub-station or any other locality where instruments connected with series transformers are to be tested.

Since the sockets or pins are placed in all of the terminals for connection with pins or sockets in either the short-circuiting plugs or plugs for outside connection, the short-circuiting "plugs" and "outside" plugs may be used upon either side of the block, adapting the block for use with either side toward the transformer secondaries.

The form shown in Figs. 6 to 8 is suited for a smaller number of connections than the other two forms, as for example, for a single transformer secondary or direct series connection through to the current coils of a measuring instrument with direct return therefrom, and is useful independently or with potential coil test connections such as have been shown in my prior pending application.

It will be evident that my block may be used for current coil test connections in connection with the potential coil test connections of my copending application for handling complete switch board circuits through to all measuring instruments, coöperating in attaining security from improper connection or careless or hazardous running of the wires upon the switch board.

It will be evident that the ribs, strips or projections upon the short-circuiting plug for the last form of my invention, coöperating with the corners or edges of the vertically swinging links are the full equivalents for some purposes of the arms (including their rods) upon my first form of short-circuiting plug and might even be considered as themselves constituting arms.

It will be evident that the use of a plurality of links is intended for additional safety and that the theoretical and to a large extent the practical benefits of my invention would be obtained by using but a single connection, herein symbolized by the link, but capable of use in other forms, and a single protective arm or rib upon the short-circuiting device.

Having thus described my invention, what I claim as new and desire to secure by Letters Patent is:—

1. In a test block, two pairs of spaced terminals, one pair adapted to receive a short-circuiting plug, a short-circuiting plug for said terminals and carrying an arm at the side thereof, adapted to lie nearer one terminal than the other and connecting links for facing terminals of opposite pairs, movable for disconnection into the path of withdrawal movement of the arm upon the short circuiting plug.

2. In a test block, pairs of spaced terminals facing each other, one pair being provided with openings for plug contacts, a short-circuiting plug adapted to fit in said openings, an arm from the short-circuiting plug and connections between facing terminals of different pairs having opening movement in different planes from that of the plug into the path of withdrawal movement of the arm of the plug.

3. In a test block, a base, two pairs of spaced, insulated terminals thereon, laterally movable, swinging link connectors between facing terminals of different pairs, a short-circuiting plug adapted to engage both terminals of a pair, and an arm carried by the plug, extending parallel to the terminals, lying nearer to the base than the connectors and between the base and one of the connectors when the latter is in open position.

4. In a test block, a pair of spaced test block terminals, a second pair of facing block terminals insulated therefrom, links pivoted in one pair of terminals and adapted to swing laterally on the opposing terminals of the second pair and apertured at the side, screws upon the second pair of terminals adapted to be engaged by the links and a short-circuiting switch plug having spring-connected pins adapted to move vertically into holes in one pair of the terminals and arms extending beside the terminals below the level of pivoted movement of the swinging links and to lie back of said links when the links are in open position.

5. In a test block, two pairs of spaced terminals, each terminal being adapted to receive interchangeably a plug of a short circuiting device or a plug for connection of an outside circuit, a spring-supported short-circuiting plug adapted to connect the terminals of the one pair and carrying an arm, and connecting links for facing terminals of opposite pairs movable for disconnection into the path of movement, in withdrawal, of the arm upon the short-circuiting plug.

6. In a test block, a short-circuiting plug comprising a handle, a spring connected therewith in its middle portion and reversely turned at its ends, parallel electrically connected pins supported by said spring and adapted to form a short-circuiting connection, in combination with arms extending at one end between the pins and spring and at the other ends each carrying a rod extending at right angles to the rest of the arm.

7. In a test block, a pair of switch block terminals, a swinging connection for one of the terminals, a pair of pins adapted to fit into the terminals, spring connection for the pins allowing relative lateral movement between them and a member connected at one side of one of the pins and adapted to co-operate with the connection in open position of the connection.

8. In a test block, pairs of spaced terminals facing each other, one pair being provided with openings for contacts, a short-circuiting member comprising a handle, contacts and resilient mounting between the handle and contacts, connections between facing terminals of different pairs having opening movement and a device upon the short-circuiting member movable with one of the contacts through the path of opening movement of one of the connections.

9. As an article of manufacture, a pair of members adapted for slip-joint connection, a support for the members electrically connecting them and provided for relative lateral movement of the members, and an arm connected with the support extending in the general direction of the members and then at right angles thereto.

PERCY H. BARTLETT.

Witnesses:
WM. STEELL JACKSON,
J. LUTHERIA KAUFFMAN.